United States Patent Office 3,430,236
Patented Feb. 25, 1969

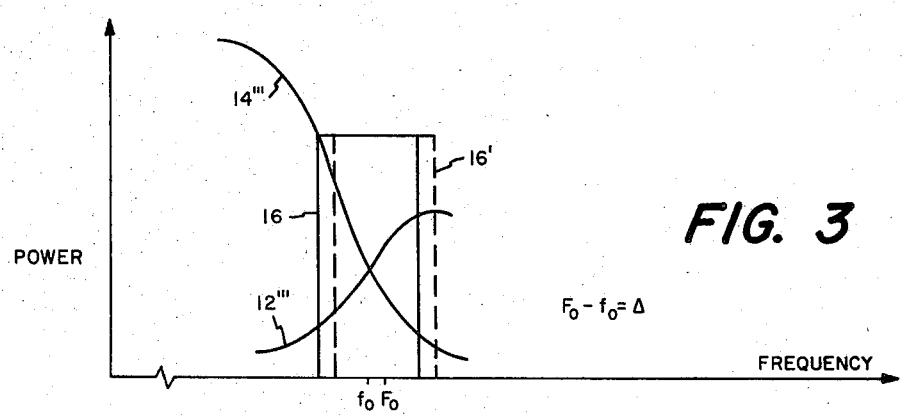
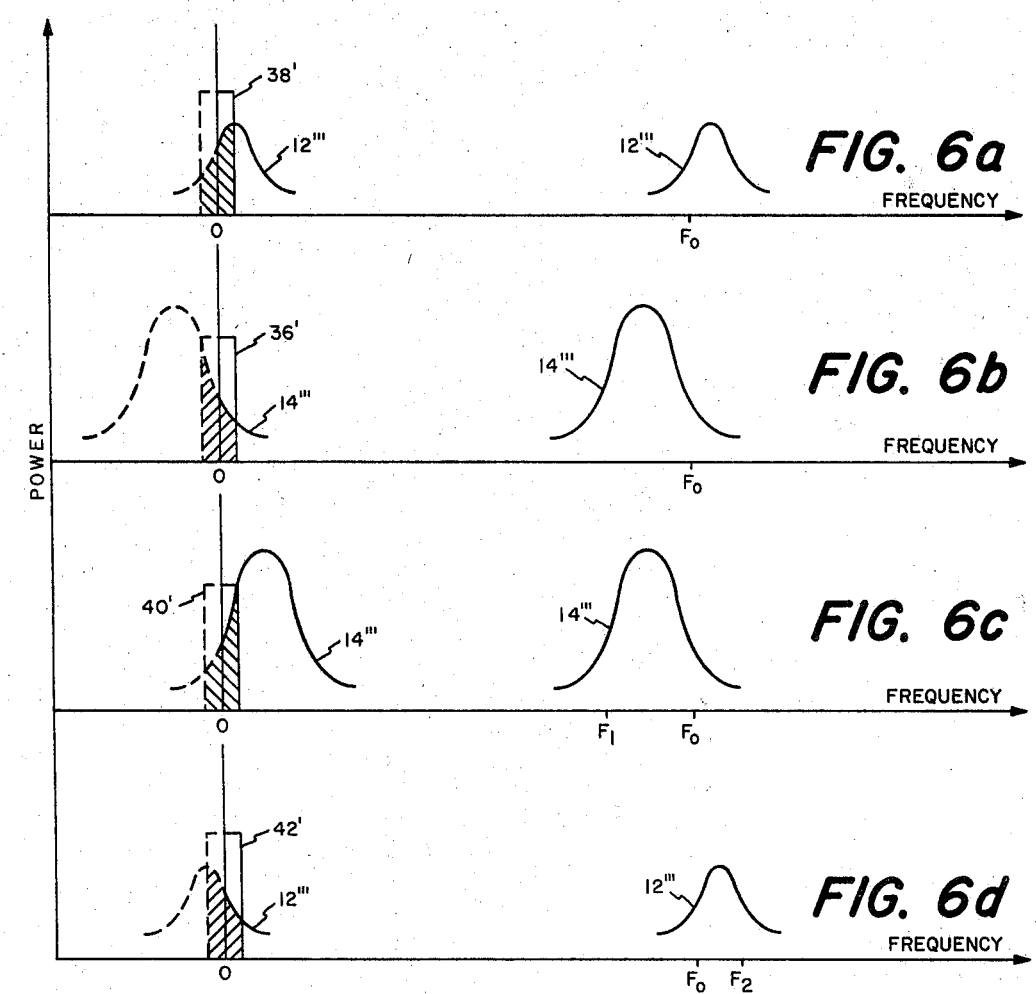

3,430,236
METHOD AND MEANS FOR ELIMINATING BEAM REFLECTION ERRORS IN A DOPPLER RADAR SYSTEM
George R. Gamertsfelder, Pleasantville, N.Y., assignor to General Precision Systems Inc., a corporation of Delaware
Filed Sept. 15, 1967, Ser. No. 667,950
U.S. Cl. 343—7
Int. Cl. G01s 9/02
16 Claims

ABSTRACT OF THE DISCLOSURE

Method and means are described for eliminating overwater beam reflection errors in a Doppler radar system. Dual overlapping Doppler spectra are derived from a dual beam antenna system and applied to a frequency tracker comprising three interconnected servo loops. Each loop, in turn, comprises a mixer, a low-pass filter, an integrator, and a voltage controlled oscillator which latter serves as the local oscillator for the mixer. The loops track the frequencies $F_0$, $F_1$, and $F_2$ where $F_0$ is equal to the dual spectra cross-over frequency plus the overwater "calibration-shift" error frequency, and $F_1$ and $F_2$ are frequencies symmetrically disposed about the center frequency of each respective Doppler input spectrum with reference to $F_0$. The outputs of the three loops are then combined in accordance with the relation $$\frac{3}{4}F_0 + \frac{F_1}{8} + \frac{F_2}{8}$$

to yield the true cross-over frequency $f_0$. The latter is invariant and completely independent of changes in terrain scattering characteristics. What is more, each low-pass filter has a passband width equal to the spectral width of either input spectrum thereby minimizing fluctuation errors due to the statistical or "noiselike" character of the Doppler input signal.

BRIEF SUMMARY OF THE INVENTION

The present invention relates generally to microwave systems of the so-called Doppler type and more particularly, to a method and means for improving the efficacy of airborne Doppler radars over diverse terrain conditions.

In one of its aspects, the inventive concept relates to an improvement in the response of Doppler radar sensors to high frequency data inputs, while another of its more specific aspects pertains to an improvement in the overwater performance of such radars.

As is well-known, airborne Doppler radar systems usually transmit one or more beams of microwave electromagnetic energy to the earth's surface and receive through appropriate antennas the resulting backscattered portion of energy. Due to the relative motion between the radar system and the earth's surface, the backscattered or return energy has undergone the familiar Doppler shift in frequency in accordance with the relation $$D_{shift} = \frac{2V}{\lambda} \cos \gamma \quad (1)$$

where V is the velocity of the radar system, $\lambda$ is the wavelength of the transmitted beam, and $\gamma$ is the angle between the transmitted beam and the direction of motion, sometimes referred to as the beam "looking angle." Thus, by measuring the Doppler frequency shift, a measurement of the velocity of the radar system and therefore the airborne vehicle within which it is located may be obtained. This measurement however is not as simple as one would like it to be. For one thing, the propagated beams cannot be made of zero width which is to say they generally illuminate appreciable areas on the earth's surface having different $\gamma$ angles. As a result, the Doppler return consists of a broad spectrum of frequencies, rather than a single discrete frequency. Furthermore, since the illumination of each target surface is at a maximum at the center of the transmitted beam and is diminished in power toward the edges, the derived signal spectrum has amplitude and frequency components which are approximately Gaussian in distribution.

From still another point of view, the spectral character of the return signal is influenced by the fact that the Doppler echo is not derived from a single scatterer since, as mentioned, a reasonably large area of the ground or of the surface of the sea is illuminated by the transmitted energy. Rather, in effect, the target comprises a large number of randomly positioned physically independent scattering centers. This means that the net return signal made available is composed of a large number of waveforms reflected by many scatterers and each constituent waveform has an amplitude and a phase determined by the corresponding scattering center in the target area. These amplitudes and phases are randomly distributed quantities, and the way in which they combine changes as the angle from which they are viewed changes, hence their sum fluctuates constantly and the return signal can be adequately described only in statistical terms. In fact, the Doppler spectrum may be said to be statistically equivalent to narrow-band noise, with the band center-frequency being the desired mean Doppler frequency.

Inasmuch as the instantaneous frequency of such band limited "noise" signals will always be fluctuating even at constant vehicle speeds, it is plain that a specialized device is required to measure and continuously track the average frequency, or the center frequency of the Doppler spectrum. As might be expected, such devices are usually referred to as "frequency trackers" and have as their basic function the computation of a speed analog from the spectral data supplied by the receiver. Incidentally, as is well-known in the art, the frequency tracker output may be additionally used to position the antenna, from which a measurement of the vehicle's drift angle may also be obtained. However, for the purposes of the present disclosure it will be sufficient to consider that the frequency tracker functions merely as a speed measuring device.

Owing to the aforementioned statistical nature or "noiselike" character of the return signal, the accuracy of prior art frequency trackers has heretofore been severely limited in making the center frequency measurement over a finite sampling interval. In other words, frequency trackers are usually smoothing or averaging devices whose accuracy over a relatively long period of time may be excellent, but whose short-term accuracy or response to high frequency changes of input data is relatively poor due to fluctuation errors.

Another factor affecting the accuracy of frequency trackers in particular, and therefore Doppler radars in general, is the shift in the trackers' calibration constant (i.e., Doppler c.p.s./knot) when the system in question switches terrain modes, namely from over land to over water and vice versa. The "calibration shift" arises from the fact that the amount of microwave energy backscattered toward the transmitting source is a function of the nature of the reflecting terrain. Backscattering from land is almost completely isotropic at all angles of incidence, so that the amount of energy received at the source is for all intents and purposes independent of the incidence angle. This is not true, however, when the microwave beam energy is reflected back to the source from a relatively smooth surface such as water. In this case, the amount of energy in the return signal is not only a function of the nature of the water surface but of the angle of incidence of the transmitted beam as well. Rough water backscatters more than smooth water does, and much more is backscattered at small angles of incidence than at large angles. By way of example, experiment has shown that at a typical angle of incidence, say 33°, a water surface corresponding to 1 to 2 on the Beaufort wind scale has scatter properties reflecting 13 db less microwave signal than a land surface would have. What actually happens therefore, is that when the radar carrying vehicle begins to fly over water, the return signal strength corresponding to those portions of the beam having greater incidence angles decreases suddenly although the vehicle is traveling at a constant velocity and a different Doppler shift is observed. This changes the calibration constant of the frequency tracker and a "scale factor" error is introduced into the tracker's velocity output.

In the patent issued to Gus Stavis 3,113,308 entitled "Apparatus for Measuring Doppler Frequency Differences" there is described a technique and apparatus for substantially reducing the "calibration shift" errors alluded to above. In brief, Stavis employs dual beams for the transmitted microwave energy. By dual beam is meant two beams radiated at slightly differing "looking angles" so that their illumination contours partially overlap producing a narrower cross-section common to both. The dual beams are alternately generated on a time-shared basis via a microwave lobing switch. A frequency tracker is then utilized to lock onto and track the center of a narrowly filtered passband of frequencies centered at the cross-over region of the two Doppler spectra secured from the dual beams. Since this cross-over region corresponds to an illuminated target area encompassing only a very small "looking angle" range, the "calibration shift" error is sharply reduced. Implicit in the Stavis method is the concept that the error varies directly as square of the ratio of filter passband width to spectrum width, and, thus, theoretically, at least, the error could be eliminated in its entirety if an infinitely narrow filter were to be used in the frequency tracker.

This approach suffers, however, since, as it is wellknown, the narrower the filter bandwidth the greater the fluctuation error attributable to the "noiselike" or statistical nature of the spectra being processed in the frequency tracker. Ideally, minimum fluctuation errors are realized only when the filter bandwidth is equal to the spectral width of the input signal, in which case the Stavis method gives no reduction in over-water error.

In contrast, the present invention relates to a novel frequency tracking technique which not only completely eliminates over-water "calibration shift" errors but at the same time minimizes fluctuation errors, thus greatly improving the state-of-the-art performance of airborne Doppler radars.

Briefly stated, there is described a frequency tracker comprising three interconnected servo tracking loops. In a strictly functional sense, the three loops may be thought of as positioning three separate filter passbands relative to a pair of overlapping Doppler spectral signals such as that secured from the dual beam Doppler radar system disclosed in the Stavis patent, supra. By "positioning" is meant a relative variation or change between the center frequencies of a filter passband and a Doppler spectral signal, respectively, until they assume a predetermined relation. In the present invention, a first passband is positioned at the cross-over region of dual Doppler spectra until it alternately passes frequencies from each spectrum having equal power. The passband will then be centered at a frequency $F_0$. At this position, the first passband additionally serves as a common filter for two pairs of filters respectively bracketing each spectrum. Thus, the second and third passbands are positioned at frequencies $F_1$ and $F_2$, respectively, which frequencies are symmetrically disposed about each spectral center frequency with reference to $F_0$. As before, positioning will be achieved by equalizing the power of the frequencies passed by the $F_1$ and $F_0$ passbands, and the $F_2$ and $F_0$ passbands, respectively. Thus, with respect to one spectrum, portions of its frequencies are sampled by the first and second passbands in one servo loop; while with regard to the other spectrum, portions of its frequencies are sampled by the first and third passbands in a second servo loop. The third loop compares portions from both spectrums via the first passband only. When all three passbands are properly positioned at $F_1$, $F_2$ and $F_0$ respectively, and the loops are balanced, the filters in the first and second loops will pass equal power from a single, although different spectrum. On the other hand, the filter in the third loop passes frequencies of equal power from both spectrums on a time-shared basis. The outputs of all three loops are then averaged in accordance with the relation $$\frac{3}{4}F_0 + \frac{F_1}{8} + \frac{F_2}{8} \qquad (2)$$

to derive the dual spectra cross-over frequency $f_0$. Inasmuch as the latter remains invariant despite "calibration shift" of each spectrum, the tracker output will be independent of changes in the nature of terrain. Moreover each of the filter passbands has a width approximately equal to the width of a single spectrum thereby minimizing fluctuation errors.

Accordingly, it is the primary object of the present invention to provide a frequency tracking technique and suitable means therefore having little or no susceptibility to the beam reflection and spectral fluctuation errors described above. These and other objects and advantages will be apparent from a study of the following detailed description of the preferred form of the invention, read in connection with the accompanying drawings.

BRIEF DESCRIPTION OF THE DRAWINGS

FIG. 3 is an enlarged detail of FIG. 2;

FIGS. 6A–D are schematic plots in the power-frequency domain illustrating various aspects of operation of the tracker diagramed in FIG. 5.

DETAILED DESCRIPTION OF THE INVENTION

Figure 1:
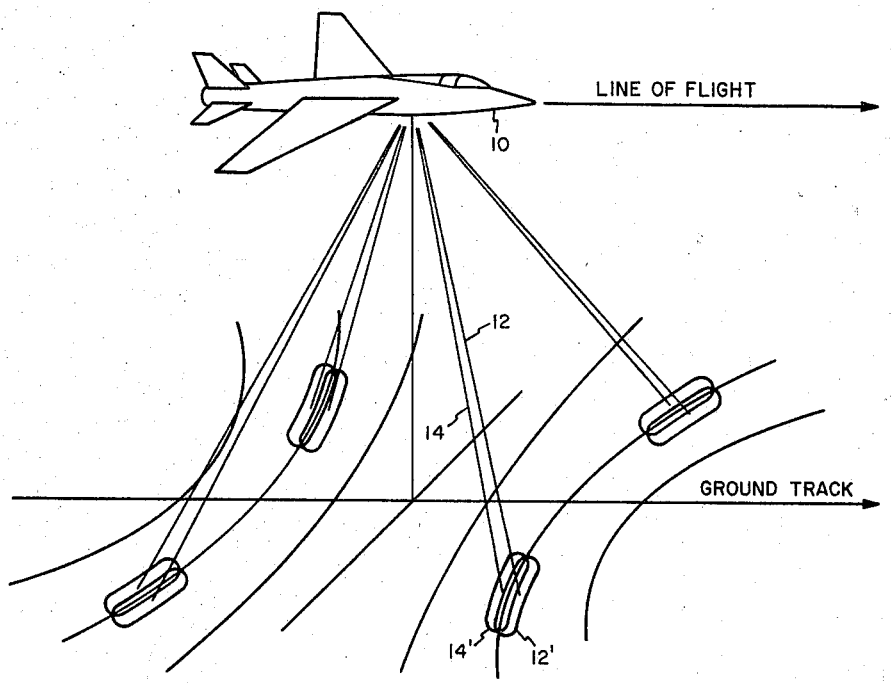
FIG. 1 is a schematic diagram depicting a dual beam Doppler radar antenna pattern.

Referring now to FIG. 1, there is schematically shown an airborne vehicle 10 traveling in the direction of ground track. Located within the vehicle is a Doppler radar set such as that disclosed in the aforementioned Stavis Patent 3,113,308, for example. The Doppler radar is equipped with suitable antenna apparatus for transmitting a plurality of dual beams toward the surface of the earth, two such dual beams being directed forward to the right and left of ground track and the other two being directed rearward to the right and left. Each dual beam is composed of a pair of beams, such as beams 12 and 14, which are pointed so nearly in the same direction that their illumination contours 12′ and 14′ partially overlap on the surface of the earth as shown. Each beam in each dual beam pair may be generated simultaneously or alternately on a time-shared basis. When the beams are alternately switched, the process is usually termed "lobing" and the rate of alternation the "lobing frequency." For a complete description of a suitable antenna apparatus capable of generating the dual beam configuration indicated in FIG. 1, reference is made to the patent to Rearwin 2,967,301 entitled "Selective Directional Slotted Waveguide Antenna." However, it is to be understood that any known antenna construction capable of generating the dual beams described above will satisfy the requiremets of the present invention.

For purposes of simplifying the ensuing discussions, only the effects of the two beams 12 and 14 will be referred to since it may be assumed that the other beams operate in similar fashion. The backscattered Doppler shifted microwave echo signals resulting from beams 12 and 14 are received via the antenna in the vehicle 10 and conducted to the Doppler radar receiver wherein they are coherently detected and amplified in a well-known manner. Suffice it to say that the receiver output comprises two broad-frequency-spectrum signals partially overlapping in frequency having center frequencies slightly displaced from each other. The magnitude of each center frequency as indicated by Equation 1 is dependent upon aircraft speed, the microwave transmitting frequency, and the beam "looking angle" and usually ranges, by way of example, between 3 and 40 kHz. In addition, the width of each signal spectrum is typically about 15 percent of the spectral center frequency. Furthermore, if beam "lobing" is employed, the individual spectra corresponding to the beams in each dual pair will alternately appear in time at the receiver output at a rate determined by the "lobing frequency," a typical value for the latter being 100 Hz.

Again, considering only the Doppler spectra derived from beams 12 and 14, these signals are then applied to a frequency tracker for interpretation.

Figure 2:
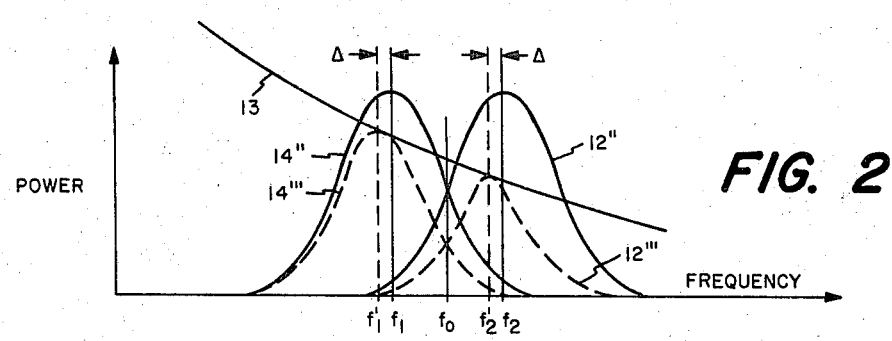
FIG. 2 is a plot in a power-frequency domain showing Doppler receiver output signal spectra.

In order to more fully appreciate the novel aspects of the frequency tracking technique according to the present invention it would be helpful to review briefly the operation of the prior art frequency tracker in connection with FIGS. 2 and 3.

When the airborne vehicle traverses terrain having isotropic scattering characteristics such as those possessed by land, for example, the spectral signals emitted by the receiver will appear in the power-frequency domain as schematically indicated by the solid line curves in FIG. 2 wherein spectrum 12″ corresponds to the return from illumination contour 12′ (FIG. 1) and spectrum 14″ is associated with the echo from contour 14′ (FIG. 1). These spectra as drawn are identical except for their center frequencies and in fact will be identical since, as mentioned, reflection from a land surface is independent of incidence angle. Moreover each spectrum itself is symmetrical since the beam shapes involved are usually symmetrical in the fore and aft direction about their transverse axes.

Conceptually, the prior-art frequency tracker positions a narrow band filter at the cross-over region of the symmetrically related spectra until the filter passes equal power from each. At this point the center frequency of the filter passband will be equal to the cross-over frequency of the spectra, $f_0$. The signals passed by the filter are thus derived from the relatively narrow overlapping area common to beams 12 and 14 (FIG. 1) and therefore encompass only a very small range of looking angle.

Now consider what happens when the terrain being traversed is such that reflection depends upon incidence angle as is the case when the radar carrying vehicle is traveling over water. In this situation, less energy is backscattered from the upstream portions of the illumination contour 12′ in FIG. 1 than the downstream portions. Likewise, less total energy is backscattered from beam 12 than from beam 14. During over water operation, therefore, both derived spectrums 12″ and 14″ will, in effect, be multiplied by a scattering characteristic curve indicated in FIG. 2 by line 13, representing the water reflection as a function of the incidence angle expressed in terms of frequency. This beam reflection characteristic combines to alter the relative amplitude and center frequencies of the power spectra associated with the receiver output signal as shown by the broken line curves 12‴ and 14‴ in FIG. 2. Note that the spectral maxima in each lobe 12‴ and 14‴ have been displaced to the left on the frequency scale by the same amount equal to the over water "calibration shift" error Δ. That is, spectra 12‴ and 14‴ which formerly had their center frequencies at $f_1$ and $f_2$ now have them respectively at $f_1'$ and $f_2'$. Furthermore, the downstream lobe 14‴ is considerably larger than the upstream lobe 12‴ due to relatively less attenuation of the former by the reflection characteristic. Nonetheless it will be noted that the cross-over frequency remains fixed at $f_0$, since the initial spectral amplitudes at $f_0$ were equal and each was multiplied by the same quantity, namely the value of curve 13 at $f_0$. Hence, over water the amplitude must still be equal at $f_0$ and therefore the cross-over frequency remains independent of changes in the nature of terrain. Because of the asymmetrical relation now existing between spectral lobes 12‴ and 14‴, however, and the finite width of the filter passband, the latter no longer tracks the true cross-over frequency $f_0$ but instead locks onto an erroneous frequency $F_0$. This state of affairs is depicted in great detail in FIG. 3 wherein the filter passband indicated by rectangle 16 is shown normally centered at $f_0$. Observe that when reflection is a function of incidence angle the downstream lobe passes more power than the upstream lobe as indicated by the greater area subtended within rectangle 16 by curve 14‴ vis-a-vis curve 12‴. Obviously in order to pass equal power from the two spectra the filter passband must be displaced upstream on the frequency scale to a new position represented by the broken line rectangle 16′ where the area under the respective curves are equal. At its new position the center frequency of the passband will be equal to $F_0$ and the frequency difference $F_0 - f_0$ will be equal to the actual "calibration shift" error incurred by the system.

It is further evident from FIG. 3 that if an infinitely sharp filter having zero width were positioned at $f_0$ where the amplitudes of curves 12‴ and 14‴ are equal, the "calibration shift" error would be zero. Thus, the accuracy of the prior art dual beam method as described in connection with FIGS. 2 and 3 depends upon the sharpness of the filter passband used to track the cross-over frequency. Unfortunately, the narrower the filter bandwidth, the greater the fluctuation error due to the "noise-like" or statistical nature of the Doppler spectra.

By comparison, the frequency tracker according to the present invention utilizes a wide band filtering technique which not only completely eliminates "calibration shift" errors but at the same time sharply reduces fluctuation errors to their minimum.

Although a full treatment of the fluctuation error problem is believed to be beyond the scope of the present invention, it can be demonstrated mathematically that fluctuation errors are reducible to their minimum value only when a filter bandwidth is employed equal to the spectral width of the input signal. See, for example the article in the Journal of Applied Physics, vol. 25, August 1954, pp. 1025–36, by Schultheiss et al., entitled "Short-time Frequency Measurement of Narrow-band Random Signals in the Presence of Wide-band Noise." Thus instead of using an extremely narrow filter passband to track the cross-over frequency associated with a dual spectra Doppler input signal, it is one of the novel features of the present invention to employ a relatively wide filter passband equal in width to the spectral width of a single spectrum or lobe. This is made possible because it has been found that the "calibration shift" error in the dual lobe system described above is equal to and opposite in sign relative to the "calibration shift" error of a single lobe in such system when the tracking filter bandwidth is equal to the spectral width of the single lobe. For example, consider the "calibration shift" error Δ for each lobe of the Doppler input signal as represented in FIG. 2. This error is proportional to $$-(\Delta f)^2 m \qquad (3)$$

where $\Delta f$ is related to the spectral width of each lobe and $m$ is the slope of the beam reflection characteristic relating the logarithm of reflectivity to angle of incidence. The minus sign indicates that the error tends to lower the mean frequency of each spectral lobe. On the other hand, the "calibration shift" error $F_0-f_0$ actually occurring in the system is indicated in FIG. 3 and may be shown to be proportional to $$+(\Delta F)^2 m \quad (4)$$

where $\Delta F$ is now related to the width of filter passband 16 and $m$ again represents the slope of the beam reflection characteristic. The plus sign indicates that the error frequency tracked by the filter is greater than the cross-over frequency common to the dual spectra. From relations (3) and (4) it is clear that when the width of filter passband 16 is equal to the spectral width of a single lobe, say spectrum 14″, the "calibration shift" error arising from the use of such a wide band filter will be equal to and opposite in sign to that which occurs for the single lobe. What this suggests, in short, is that the center frequencies of each "shifted" spectral lobe may be averaged together and the result averaged again with the erroneous crossover frequency tracked by the wideband filter to arrive at a quantity representing the true cross-over frequency. The latter, of course, will be free of any "calibration shift" error whatsoever since as mentioned $f_0$ remains invariant despite changes in the nature of the backscattering terrain.

Turning now to FIG. 4 there is again schematically shown a plot in the power-frequency domain representing the overlapping-spectra receiver output signal resulting from operation of a dual beam Doppler radar over a terrain surface having a sloping reflection characteristic. However, this time, in addition to a single filter passband 16 tracking the cross-over frequency $f_0$, there are represented two other filter passbands 18 and 20. Passband 18 is normally positioned at a frequency $F_1$ while passband 20 is normally positioned at a frequency $F_2$. The crossover frequency passband 16 as previously described is normally positioned at $F_0$.

It is to be understood that although these passbands are represented as relatively narrow rectangles, this is done merely to avoid confusing the diagram. Actually the frequency response curves of each and every one of the three filter passbands indicated in FIG. 4 has a width equal to the spectral width of a single lobe; that is, either lobe 12‴ or 14‴, and a shape similar to that of the spectra.

It will be recalled that when backscattering toward the transmitting source is isotropic as it usually is over land, for example, the dual lobes 12″ and 14″ of FIG. 2 are symmetrical with respect to each other. The cross-over frequency $f_0$ is therefore merely the arithmetical average of the center frequencies of the respective spectra, or $$f_0 = \frac{f_1 + f_2}{2} \quad (5)$$

However, when backscattering decreases with incidence angle as is the case over water, the distorted spectral lobes 12‴ and 14‴ obtain as shown in FIG. 2. In this situation, the corresponding center frequencies of each lobe become respectively $$f_{1'} = f_1 - \Delta \quad (6)$$

and $$f_{2'} = f_2 - \Delta \quad (7)$$

where $\Delta$ represents the "calibration shift" frequency error. Expressing the average between these new center frequencies as $f_a$, we get $$f_a = \frac{f_1' + f_2'}{2} \quad (8)$$

Substitution of Equation 6 and 7 into Equation 8 reduces the latter to $$f_a = \frac{f_1 - \Delta + f_2 - \Delta}{2}$$
$$= f_0 - \Delta \quad (9)$$

Equation 9 indicates that by averaging together the center frequencies of the "shifted" spectra, a new frequency $f_a$ may be obtained equal to the cross-over frequency minus the "calibration shift" error of a single lobe.

Now, it is already known from FIG. 3 and relations (3) and (4) that when the width of filter passband 16 is equal to the spectral width of a single lobe, the filter will track a frequency equal to the cross-over frequency plus the "calibration shift" error of a single lobe, that is $$F_0 = f_0 + \Delta \quad (10)$$

Subsequent averaging of expressions (9) and (10) yields $$\frac{f_a + F_0}{2} = \frac{f_0 - \Delta f_0 + \Delta}{2} = f_0 \quad (11)$$

Equation 11 thus makes it clear that when the average of the "shifted" spectra center frequencies is again averaged with the frequency tracked by the cross-over frequency filter (passband 16) the result is a measure of the true cross-over frequency $f_0$ which latter will be entirely free of the "calibration shift" error $\Delta$ and which therefore will be invariant with changes in the nature of the backscattering terrain.

In accordance with the concepts of the present invention the averaging processes described above may be carried out by positioning the three filter passbands represented in FIG. 4 about the Doppler input spectra as follows. Passband 16, as usual, is positioned relative to the two spectra 12‴ and 14‴ until equal power is passed by each, at which point the passband center frequency will correspond to $F_0$. Then passband 18 is positioned so that it and passband 16 are symmetrically positioned about spectral lobe 14‴, that is, until they pass equal power. When this occurs passband 18 will be positioned at $F_1$. In similar fashion passband 20 is positioned so that it and passband 16 are symmetrically disposed about spectral lobe 12‴ and equal power is passed through each. At this juncture, the center of passband 20 will be positioned at $F_2$. Inasmuch as $F_1$, $F_2$ and $F_0$ are now known, the center frequencies of each spectral lobe may be derived since $$\frac{F_1 + F_0}{2} = f_1' \quad (12)$$

and $$\frac{F_2 + F_0}{2} = f_2' \quad (13)$$

Substituting Equations 12 and 13 into Equation 8 we get $$f_a = \frac{\frac{F_1 + F_0}{2} + \frac{F_2 + F_0}{2}}{2} \quad (14)$$

which, of course, refers to the average of the center frequencies of the "shifted" spectra. All that remains is to average the results of Equation 14 with the frequency $F_0$ tracked by the cross-over filter in accordance with Equation 11. Substitution of the right side of relation (14) into Equation 11 thus yields $$\frac{f_a + F_0}{2} = \frac{\frac{F_1 + F_0}{2} + \frac{F_2 + F_0}{2}}{2} + F_0}{2} \quad (15)$$

And since $$\frac{f_a + F_0}{2} = f_0$$

Equation 15 finally reduces to $$f_0 = \frac{3}{4} F_0 + \frac{F_1}{8} + \frac{F_2}{8} \quad (16)$$

Figure 4:
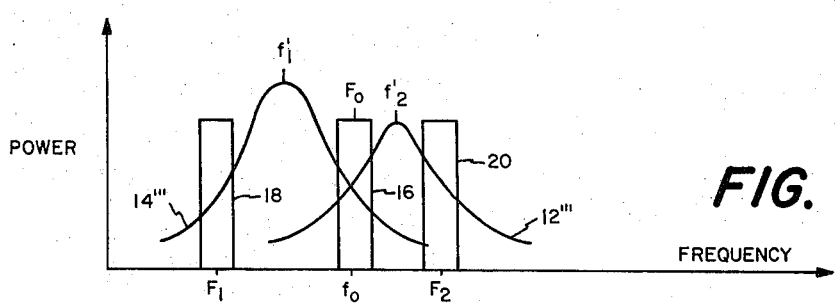
FIG. 4 is a schematic plot in the power-frequency domain illustrating the principles of the invention.

In its preferred embodiment, the frequency tracker according to the present invention comprises three frequency tracking loops for positioning the three filter passbands of FIG. 4 at $F_1$, $F_2$ and $F_0$ as described above. The tracker includes additional means for combining the frequency outputs of the respective loops in accordance with the right side of Equation 16 and thus continuously secures a true measure of the invariant cross-over frequency $f_0$. What is more, since the tracker utilizes filter passbands equal in width to the spectral width of the input signal its output is further optimized to have minimal fluctuation error.

Thus, with reference now to FIG. 5 suitable and sufficient means for instrumenting the principles of the invention will be described.

Assuming operation over water, the Doppler radar receiver (not shown) continuously extracts a dual spectrum Doppler information signal from beams 12 and 14 (FIG. 1) as before described and impresses this signal upon input terminal 22. When beam lobing switch 24 is in the state shown, that is with contacts 24a, 24b, and 24c in their uppermost positions, spectrum 12′′′ (FIG. 4) will appear simultaneously on conductors 26 and 28. Similarly, when the lobing switch is in its opposite state and contacts 24a, 24b and 24c are in their lowermost positions, a signal corresponding to spectrum 14′′′ will be made available on conductors 26 and 28. In either case, the spectral input signal is simultaneously applied to identical mixers 32 and 34. Through the periodic action of switch contacts 24a and 24b the outputs of the two mixers are alternately coupled to a first pair of low-pass filters 38 and 42 and then to a second pair of low-pass filters 36 and 40 at a rate determined by the "lobing frequency" of the antenna system.

As pointed out above in connection with FIG. 4, the invention specifiies that three spectral width filters be positioned relative to the Doppler spectra so that their respective passbands are centered at the frequencies $F_0$, $F_1$ and $F_2$. In the actual preferred embodiment, however, all filters have fixed passbands centered at zero frequency and the various spectra are positioned or shifted relative thereto using conventional heterodyning methods. Nonetheless, the results are the same.

To illustrate, assume momentarily that a local oscillating signal having a frequency slightly less than $F_0$ is available on line 90 and is therefore keying mixer 32. The input spectrum 12′′′ is heretrodyned in the mixer and the resulting sum and difference frequency sidebands passed via contact 24a to low-pass filter 38. The latter has flat bandpass response extending from zero frequency to a frequency approximately one-half that of the input spectrum's width and thus passes a portion of frequencies from the lower sideband beat down to the neighborhood of zero frequency. This is indicated schematically in FIG. 6A where the spectra input signal to the mixer is shown on the right and thet heterodyned signal on the left. The fact that the center frequency of the heterodyned spectrum 12′′′ is slightly to the right of the zero frequency line indicates that the mixer output difference signal is considered a positive frequency when the input signal frequency is higher then the local oscillator frequency. In FIG. 6A, that portion of the heterodyned signal to the left of the zero frequency line is represented by a broken line curve. This is to indicate that the existence of the heterodyned output in the negative frequency domain is purely hypothetical. In reality, the broken line portion of spectrum 12′′′ is folded over the zero frequency line and appears physically on the latter's right side; however, it simplifies the explanation to consider that the spectrum theoretically extends into the negative frequency domain as shown. When this is done, the passband of filter 38 which is indicated in FIG. 6A by the solid line rectangle 38′ may likewise be considered to be mirror imaged in the negative frequency domain as represented by broken line rectangle to the left of the zero frequency line. Thus, for all intents and purposes, the filter passband may be considered to be centered at zero frequency and to have a width including its reflection about zero frequency equal to the spectral width of spectrum 12′′′. Accordingly, the portion of signal frequencies from the heterodyned spectrum passed through filter 38 is indicated in FIG. 6A by the shaded area under curve 12′′′. The filter output comprising these signal frequencies is then applied directly to detector 48 as shown in FIG. 5.

This detector, comprising a conventional square-law device, rectifies the filter output signal and emits a D.C. signal having a magnitude proportional to the square of the voltage applied to it. Accordingly, the magnitude of the detector output signal represents the power content of the filter output signal. The rectified detector output signal is then fed simultaneously to summing points 60 and 64.

Lobing switch 24 subsequently switches contacts 24a–c to their lowermost positions and a spectral input signal corresponding to lobe 14′′′ is now simultaneously applied to each mixer 32 and 34 along conductors 26 and 28. The new spectrum is again heterodyned to near zero frequency in mixer 32 as shown on the left side of FIG. 6B and a portion thereof indicated by the shaded area in rectangle 36′ is passed through filter 36. Detector 46 which is identical to detector 48 rectifies the filter output signal and simultaneously feeds a D.C. signal whose magnitude is proportional to the power passed by filter 36 to summing points 60 and 62. Summing point 60 is adapted to algebraically compare the signal outputs between detectors 46 and 48 and thus produces a difference "error" signal proportional to the discrepancy in signal power passed by filters 36 and 38. This "error" signal output from summing point 60 is then directly applied to an integrating circuit 72 whose output voltage, in turn, linearly controls the frequency of the output of voltage-controlled oscillator 78 in accordance with the magnitude and polarity of the integrated "error" signal. That is, the frequency of the oscillator output signal will be either raised or lowered unless, of course, the "error" signal is zero in which case the frequency of the oscillator output will remain constant.

It was pointed out previously that the relatively wide filter passband tracking the cross-over frequency passes equal power from each spectrum only when the passband centers at $F_0$. Since the condition of zero "error" output at summing point 60 corresponds to a state of equilibrium where equal power is being passed through each filter 36 and 38, the frequency of the voltage output of oscillator 78 will accordingly always be equal to $F_0$ at null center.

On the other hand, in the illustrated example described above it was assumed that the frequency of the voltage on line 90 and therefore of the output of oscillator 78 was nominally close to but not equal to $F_0$ thereby creating a situation where the power passed by each filter is not equal and an "error" voltage appears at summing point 60. The "error" signal is immediately integrated in block 72 and applied to voltage-controlled oscillator 78 for automatically adjusting the frequency of the local oscillating signal on line 90 sufficient to cause both heterodyned spectra 12′′′ and 14′′′ to shift in frequency relative to their respective filter passbands 36′ and 38′ until equal power is passed by each. When the latter occurs the output of summing point 60 will null to zero and the frequency of the output of the oscillator will be equal to $F_0$. From the above description, it is obvious that the servo-like action of the feedback loop around oscillator 72 and mixer 32 will tend to maintain the equal passage of power through filters 36 and 38 once the loop is balanced and the latter is therefrom capable of tracking $F_0$ despite variations in the mean center frequencies of the dual Doppler input spectra as the vehicle operates throughout its speed range. Hence, the function of the tracker loop just described is precisely equivalent to a continuous positioning of the center of filter passband 16 at $F_0$ as discussed previously in connection with FIG. 4.

During the same interval in time when switch contact 24a is in its lowermost position, contacts 24b and 24c are also in their lowermost positions and input spectral signal 14′′′ is being applied to mixer 34 as well as mixer 32. A local oscillating signal available on line 94 and having a frequency substantially close to $F_1$ is applied to mixer 34 wherein the input spectrum is heterodyned to a substantial zero-heat-frequency as diagramed on the left side of FIG. 6C. Low-pass filter 40 then passes that portion of the heterodyned spectrum indicated by the shaded area in rectangle 40' of FIG. 6C to square-law detector 50 which emits a D.C. signal comprising the power analog of the filter output signal. The last mentioned signal is, in turn, fed to summing point 62 where it is algebraically compared with the output of detector 46 which latter simultaneously appears at this same summing point as previously explained. The resulting "error" output signal of summing point 62 therefore represents the difference in power passed by filters 36 and 40 and is subsequently applied to an integrating circuit 74 whose voltage output accordingly changes the frequency of the output signal from voltage-controlled oscillator 80. The frequency of the local oscillating signal input to mixer 34 thus changes too, shifting the frequency of the heterodyned spectrum 14''' shown on the left side of FIG. 6C. In effect, the aforementioned spectrum moves either right or left relative to filter passband 40' until the power passed therethrough is equal to the power being passed from spectrum 14''' through filter passband 36' (see FIG. 6B). When such equilibrium is achieved, the "error" output of summing point 62 will null to zero and the frequency of the output of voltage-controlled oscillator 80 will be equal to $F_1$ providing the error output of summing point 60 has also nulled to zero. The action of the feedback loop around oscillator 80 and mixer 34 in conjunction with the simultaneous operation of feedback loop 90 is equivalent to the symmetrical positioning of passbands 16 and 18 about spectrum 14''' (FIG. 4) after passband 16 has been centered at $F_0$; it being remembered that when passband 18 is sophisticated its center frequency by definition is equal to $F_1$.

Figure 5:
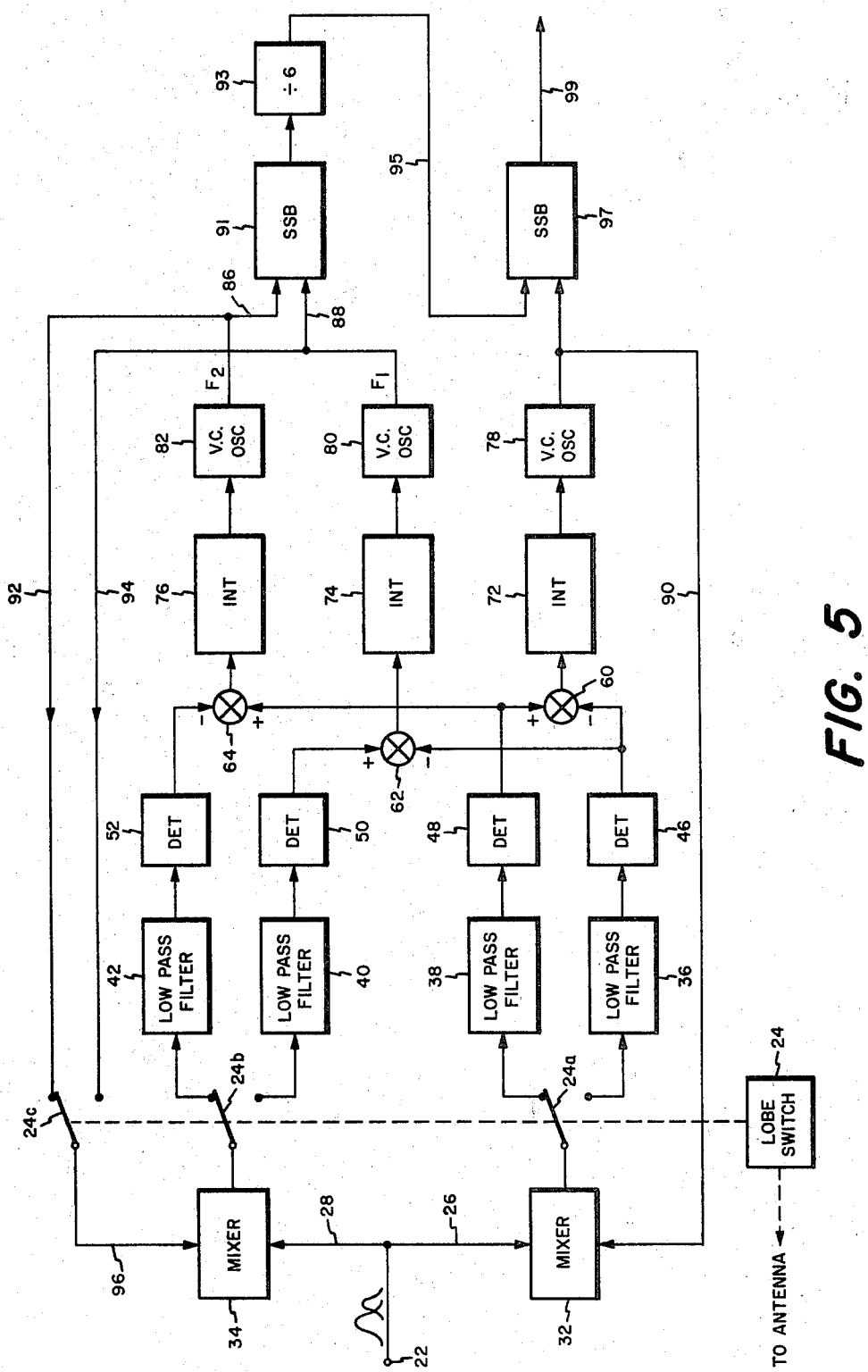
FIG. 5 is a block circuit diagram of the frequency tracker according to the present invention.

It will be recalled that when lobing switch 24 is in the position shown in FIG. 5, Doppler input spectrum 12''' (FIG. 4) is applied simultaneously to mixers 32 and 34 and the output of detector 48 representing the power passed by filter passband 38' (FIG. 6A) is being simultaneously applied to summing point 64 as well as summing point 60. During this same lobing interval, a local oscillating signal nominally close to frequency $F_2$ is made available on line 92, switch contact 24c, and conductor 96 for application to mixer 34. The input spectrum to this mixer is therefore heterodyned to a substantially zero-beat-frequency as indicated on the left side of FIG. 6D. Filter 42 then passes that portion of the heterodyned spectral signal indicated in FIG. 6D by the shaded area in rectangle 42' to square-law detector 52 for rectification. The resulting D.C. signal which is proportional in magnitude to the signal power passed by filter 42 is then applied directly to summing point 64 where it is algebraically compared with the output signal of detector 46 to produce an "error" signal indicative of the difference in power passed by filter passbands 38' and 42'. The "error" output signal from summing point 64 is then integrated in block 76 and fed to voltage-controlled oscillator 82 for changing the frequency of the latter's output signal accordingly. The frequency of the local oscillating input signal to mixer 34 is thereby altered to effectively shift the heterodyned spectrum 12''' in FIG. 6D relative to filter passband 42' until the latter passes equal power with regard to that passed by passband 38' (FIG. 6A). When the last mentioned takes place, the output "error" from summing point 64 null centers and the frequency of the output from oscillator becomes equal to $F_2$. It follows that the cooperative action between the tracker loops around oscillator 78 and mixer 32 on the one hand and oscillator 82 and mixer 34 on the other (when lobing switch 24 is in the position shown) is fully equivalent to the symmetrical positioning of filter passbands 16 and 20 about input spectrum 12''' as explained above in the context of FIG. 4. And, as stated, such symmetrical positioning results in passband 20 being centered at a frequency $F_2$ once passband 16 is centered at $F_0$.

Thus far, a frequency tracker has been described comprising three tracking loops, a different pair of which are simultaneously operative during each of the two sampling intervals defined by the action of lobing switch 24. The $F_0$ tracker loop corresponding to feedback around oscillator 78 and mixer 32 is operative during both positions of switch contacts 24a–c but it requires a full lobing cycle to develop an error signal since it compares power derived from both Doppler input spectra 12''' and 14''' (FIG. 4) only one of which exists at a time. In contrast, the $F_1$ tracker loop around oscillator 80 and mixer 32 operates only when switch contacts 24a–c are in their derived from the same single spectrum vis., spectrum lowermost position inasmuch as it compares power 14'''. Likewise, it will be appreciated that the $F_2$ tracker loop corresponding to a feedback around oscillator 82 and mixer 34 is operative only when switch contacts 24a–c are positioned as shown in FIG. 5 since it too compares power derived from a single spectrum, albeit a different one, namely spectrum 12'''. In any event, after a brief averaging period equal to several cycles of operation of lobing switch 24, all three loops will achieve steady-state conditions of loop balance whereupon the output frequencies of oscillators 78, 80 and 82 will be equal to $F_0$, $F_1$ and $F_2$ respectively.

Assuming such steady-state conditions, the $F_1$ and $F_2$ frequency outputs from oscillators 80 and 82 are continuously applied along conductors 86 and 88 to single sideband modulator 91 which then delivers an output signal having a frequency content $F_1+F_2$ to divide-by-six circuit 93. The latter's output being equal in grequency to $$\frac{F_1+F_2}{6}$$

is subsequently fed via connection 95 to a second single sideband modulator 97. Also being applied to modulator 97 is the $F_0$ output signal obtained from oscillator 78 along conductor 84. The output signal of modulator 97 appearing on conductor 99 thus has a frequency content equal to $$\frac{F_1+F_2}{6}+F_0 \qquad (17)$$

which after some manipulation may be restated as $$\frac{4}{3}\left[\frac{3}{4}F_0+\frac{F_1}{8}+\frac{F_2}{8}\right] \qquad (18)$$

Substitution of Equation 16 for the bracketed term in relation (18) then yields $$\frac{4}{3}F_0 \qquad (19)$$

which insofar as the use of the frequency tracker as a speed measuring device is concerned is just as useful an output as $f_0$, the invariant spectral cross-over frequency.

As pointed out above, minimal fluctuation errors are realized in the present invention because the passband width of the tracking filters are equal to the spectral width of the signals being tracked. However, one should not lose sight of the fact that the center frequencies of the input Doppler spectra will ordinarly vary over a rather wide range as the radar carrying vehicle operates throughout its speed range. Since, as mentioned, the spectral width of the tracker input signal is nominally 15 percent of the spectral center frequency, the spectral width of the input signal will also normally vary throughout the vehicle's operational speed range. Hence, in order to maintain extremely accurate performance, sufficient means may be incorporated into the frequency tracker of FIG. 5 to vary the passband width of filters 36, 38, 40 and 42 in direct proportion to the variation in the frequency of the tracker output signal on conductor 99. Such means may, for example, take the form of a closed loop position follow-up servomechanism around single sideband modulator 97 and each of the aforementioned filters, which latter, of course, will be of the variable type.

In connection with FIG. 5, the provision of four low-pass filters was described. However, it is obvious that by switching the output of a single filter between two detectors, only two filters are necessary and the other two may be dispensed with. In such a case, each mixer will be directly connected to a single filter and the two filters time-shared as before through lobing switch 24.

Many additional modifications within the spirit of the invention will occur to those skilled in the art. Therefore it is desired that the present invention be limited only by the true scope of the appended claims.

What is claimed is:

1. The method of eliminating beam reflection errors from spectral signals resulting from operation of a dual beam Doppler radar, said dual beam including a pair of beams having partially overlapping illumination contours on the surface of the earth, said spectral signals representing the backscattered Doppler shifted echoes from each of said contours, comprising the steps of,
    deriving a single frequency signal representing the cross-over frequency common to said spectral signals plus an error frequency due to non-isotropic beam reflection characteristics,
    averaging together the center frequencies corresponding to said spectral signals respectively, to derive an average frequency signal minus said beam reflection error frequency, and
    averaging said last mentioned average frequency signal with said single frequency signal to derive a signal corresponding only to said cross-over frequency.

2. Frequency tracker apparatus for use in a Doppler radar system wherein said system derives at least one pair of spectral signals representing the Doppler information resulting from the transmission of a pair of closely spaced partially intersecting microwave beams comprising,
    means responsive to said pair of signals for extracting a first frequency signal,
    means responsive to one of said spectral signals in said pair for deriving a second frequency signal,
    means responsive to the other of said spectral signals in said pair for deriving a third frequency signal, and
    means responsive to said first, second and third frequency signals for deriving a fourth frequency signal, said fourth frequency signal representing an average of the frequencies of said pair of spectral signals.

3. Frequency tracking apparatus for use in a Doppler radar system of the type which derives a pair of Doppler information spectral signals from at least one pair of transmitted microwave beams, said pair of spectral signals partially overlapping in frequency,
    means responsive to said pair of signals for deriving a first signal representing the apparent cross-over frequency common to said pair of signals in the presence of non-isotropic beam reflection,
    means responsive to one of the spectral signals in said pair for deriving a second signal representing a second frequency symmetrically disposed about said one spectral signal with respect to said apparent cross-over frequency,
    means responsive to the other of said spectral signals in said pair for deriving a third signal representing a third frequency symmetrically disposed about said other spectral signal with reference to said cross-over frequency, and
    means responsive to said first, second, and third signals for deriving a fourth signal representing the true cross-over frequency common to said pair of signals, the difference between said apparent cross-over frequency and said true cross-over frequency being indicative of the error introduced by said non-isotropic reflection.

4. The apparatus of claim 3, wherein said first mentioned means comprises,
    first means for heterodyning each of said spectral signals in said pair to a substantially lower frequency,
    first passband filter means centered at a predetermined frequency responsive to said pair of heterodyned spectral signals,
    means for comparing the power of each of said signals in said pair of heterodyned spectral frequencies passed by said first filter means, and
    means responsive to said comparison for changing the heterodyne frequency of said heterodyning means.

5. The apparatus of claim 5, wherein said second and third mentioned means comprises,
    second means for heterodyning each of said spectral signals in said pair to said substantially lower frequency,
    switch means actuatable periodically between two operable states,
    second passband filter means centered at said predetermined frequency responsive to one of said spectral signals in said pair of heterodyned signals when said switch means is in a first operable state and responsive to the other of said spectral signals in said heterodyned pair when said switch means is in its other operable state,
    means for comparing the power of the signals passed by said first and second filter means during both operable states defined by said switch means, and
    means responsive to said last mentioned comparison for varying the heterodyne frequency of said second heterodyning means.

6. The apparatus of claim 5, wherein the width of said first and second filter passbands is equal to the width of either of said spectral signals in said pair.

7. The apparatus of claim 5, wherein said means for varying the heterodyne frequency of said first and second heterodyning means comprise,
    a first voltage-controlled oscillator feedback coupled to said first heterodyning means,
    a second voltage-controlled oscillator feedback coupled to said second heterodyning means and operable only when said switch means is in its first operable state, and
    a third voltage-controlled oscillator feedback coupled to said second heterodyning means only when said switch means is in its other operable state.

8. The apparatus of claim 7, wherein the frequency of said first oscillator output is equal to $F_0$ when the results of said first comparison are zero, and the frequencies of said second and third oscillator outputs are equal to $F_1$ and $F_2$ respectively when the results of said last mentioned comparison during both operable states of said switch means are zero, and
said first oscillator output is equal to $F_0$ when the results quency is proportional to $$\frac{3}{4}F_0 + \frac{F_1}{8} + \frac{F_2}{8}$$

when said above mentioned comparisons are zero.

9. The apparatus of claim 7, wherein said means responsive to said first, second, and third signals comprises,
    first single sideband modulator means responsive to said second and third voltage-controlled oscillator means,
    a divide-by-six circuit responsive to the output of said modulator means, and
    second single sideband modulator means responsive to said divide-by-six circuit and said first voltage-controlled oscillator means.

10. The method of eliminating overwater beam reflection errors in an airborne Doppler radar system comprising the steps of,
    transmitting at least one pair of microwave beams toward the surface of earth at slightly different angles whereby said beams have partially intersecting cross-sections, receiving the microwave energy backscattered by said surface and extracting therefrom a pair of spectral Doppler information signals partially overlapping in frequency, deriving a first frequency signal from said pair of spectral signals representing the cross-over frequency common to said pair plus an error frequency due to said overwater beam reflection errors, deriving a second frequency signal from said pair of spectral signals representing the cross-over frequency common to said pair minus said error frequency due to said beam reflection errors, and processing said first and second frequency signals to arrive at a third frequency signal representing only the instantaneous cross-over frequency common to said pair of spectral sgnals.

11. The method of eliminating overwater beam reflection errors in an airborne Doppler radar system comprising the steps of, transmitting at least one pair of microwave beams toward the surface of the earth at slightly different angles whereby said beams have partially intersecting cross-sections, receiving the microwave energy backscattered by said surface and extracting therefrom a pair of spectral Doppler information signals partially overlapping in frequency, passing portions from each of said spectral signals in said pair through first passband filter means, positioning the center frequency of said first passband filter means in the frequency region common to said overlapping pair of signals until said filtered portions from each spectral signal respectively have equal power whereby said first passband center frequency will be positioned at a frequency $F_0$, positioning second passband filter means symmetrically about the center frequency of one of said signal spectrums in said pair with respect to said first passband center frequency $F_0$ whereby the center frequency of said second passband filter means will be positioned at a frequency $F_1$, positioning third passband filter means symmetrically about the center frequency of said other of said signal spectrums in said pair with respect to said first passband center frequency $F_0$ whereby the center frequency of said third passband filter means will be positioned at a frequency $F_2$, and averaging said frequencies $F_0$, $F_1$, and $F_2$ in accordance with the relation $$\frac{3}{4}F_0 + \frac{F_1}{8} + \frac{F_2}{8}$$

12. The method of claim 11 wherein the width of each of said first, second and third passband filter means is equal to the spectral width of either signal in said pair of spectral signals.

13. Apparatus for eliminating overwater beam reflection errors in an airborne Doppler radar system comprising, means for transmitting at least one pair of microwave beams toward the surface of the earth at slightly different angles whereby said beams have partially intersecting cross-sections, means for receiving the microwave energy backscattered by said surface and extracting therefrom a pair of spectral Doppler information signals partially overlapping in frequency, means responsive to said pair of signals for deriving a first frequency signal $F_0$, said first frequency signal being a function of the cross-over frequency defined by said overlapping pair of signals and the overwater beam reflection error, means responsive to a first one of said pair of spectral signals for deriving a second frequency signal $F_1$ symmetrically related to the center frequency of said first one of said pair of spectral signals with reference to said first frequency signal $F_0$, means responsive to the other one of said pair of spectral signals for deriving a third frequency signal $F_2$ symmetrically related to the the center frequency of said other of said pair of spectral signals with respect to said first frequency signal $F_0$, and means responsive to said first, second, and third frequency signals for averaging said signals together in accordance with the relation $$\frac{3}{4}F_0 + \frac{F_1}{8} + \frac{F_2}{8}$$

to produce an average frequency signal proportional to only said cross-over frequency.

14. The apparatus of claim 13 wherein each of said third, fourth and fifth mentioned means comprises, a mixer, a pair of low-pass filters connected to the output of said mixer, a pair of detectors respectively coupled to each of said filters in said pair, an error voltage difference circuit responsive to the output from each of said detectors, an integrating circuit connected to said different circuit, a voltage-controlled oscillator responsive to said integrating circuit, and a feedback loop connecting said oscillator output to said mixer.

15. The apparatus of claim 14 wherein each of said lowpass filters has a passband center frequency effectively located at zero frequency.

16. The apparatus of claim 14 wherein each of said low-pass filters has a passband width equal to the spectral width of either spectral signal in said pair of signals.

References Cited

UNITED STATES PATENTS

| | | | |
|---|---|---|---|
| 3,235,865 | 2/1966 | Flower et al. | 343—8 |
| 3,113,308 | 12/1963 | Stravis | 343—8 |
| 3,072,900 | 1/1963 | Beck | 343—8 |

RODNEY D. BENNETT, JR., *Primary Examiner.*

CHARLES L. WHITHAM, *Assistant Examiner.*

U.S. Cl. X.R.

343—8

PO-1050
(5/69)

UNITED STATES PATENT OFFICE
CERTIFICATE OF CORRECTION

Patent No. 3,430,236       Dated February 25, 1969

Inventor(s) George R. Gamertsfelder

It is certified that error appears in the above-identified patent and that said Letters Patent are hereby corrected as shown below:

Column 11, line 3, the phrase "zero-heat-frequency" should appear as --zero-beat-frequency--. Column 11, line 35, cancel the word "sophisticated" and substitute instead --so positioned--. Column 12, lines 15 through 16, the phrase "derived from the same single spectrum vis., spectrum lowermost position inasmuch as it compares power" should read --lowermost position inasmuch as it compares power derived from the same single spectrum vis., spectrum- Column 12, line 33, the word "grequency" should read --frequency--. Column 12, lines 52 through 54, the express "$\frac{4}{3} F_o$" should appear as --$\frac{4}{3} f_o$--. Cancel column 14, lines 47 through 60, beginning with "8. The apparatus of claim 7 to and including "comparisons are zero". and insert the following claim:

--8. The apparatus of claim 7, wherein the frequenc of said first oscillator output is equal to $F_o$ when the results of said first comparison are zero, and the frequencie of said second and third oscillator outputs are equal to $F_1$ and $F_2$ respectively when the results of said last mentioned comparison during both operable states of said switch means zero, and said fourth signal representing said true cross-ov frequency is proportional to $\frac{3F_o}{4} + \frac{F_1}{8} + \frac{F_2}{8}$ when said above mentioned comparisons are zero.--.

SIGNED AND
SEALED

JUN 16 1970

(SEAL)
Attest: